G. MEYER.
CHAIN SAW.
APPLICATION FILED NOV. 30, 1917.
1,273,394.
Patented July 23, 1918.
2 SHEETS—SHEET 1.
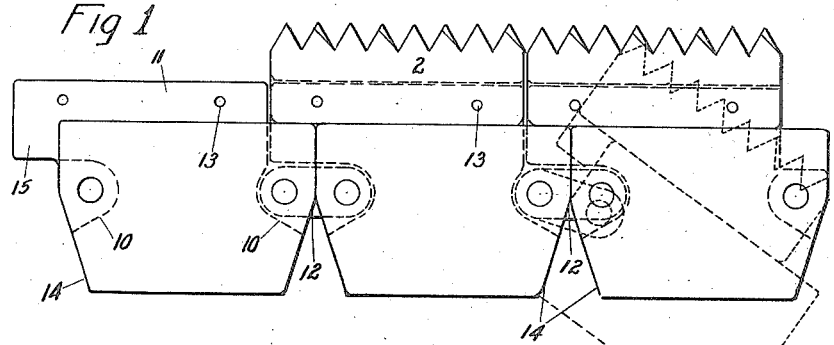
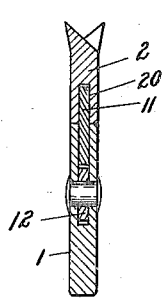
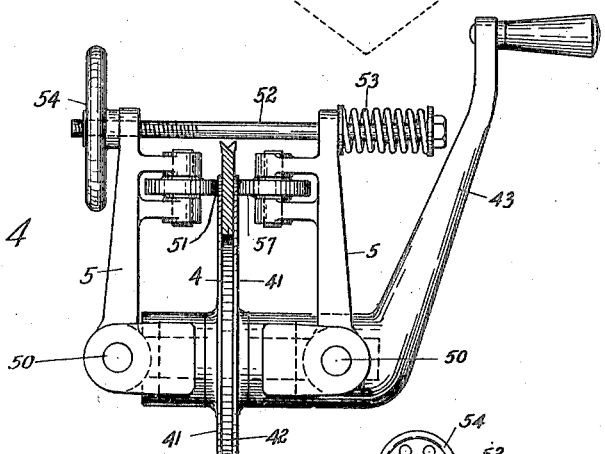
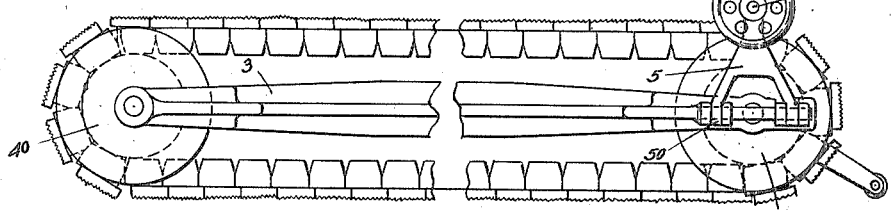
Inventor
George Meyer
By Henry L. Reynolds
Attorney

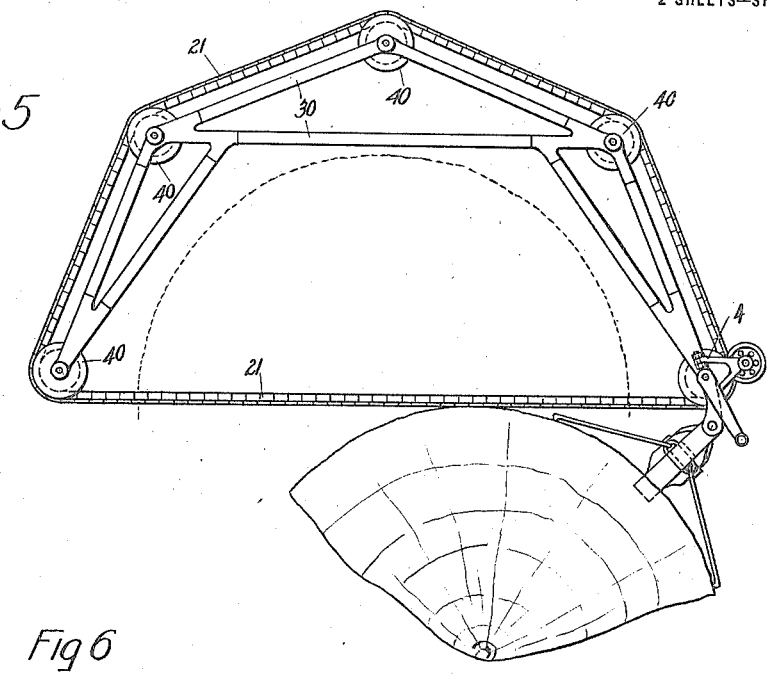
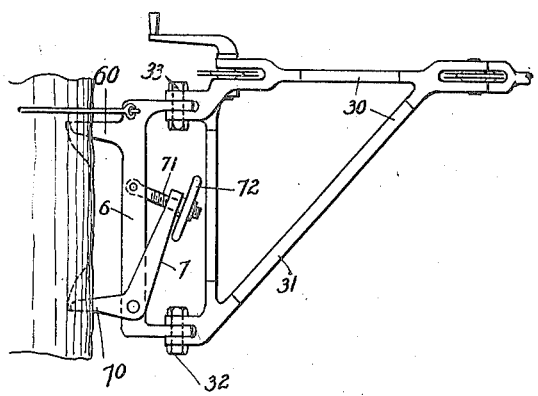

UNITED STATES PATENT OFFICE.

GEORGE MEYER, OF SEATTLE, WASHINGTON.

CHAIN SAW.

1,273,394.          Specification of Letters Patent.          Patented July 23, 1918.

Application filed November 30, 1917. Serial No. 204,516.

*To all whom it may concern:*

Be it known that I, GEORGE MEYER, a citizen of the United States, and resident of the city of Seattle, county of King, and State of Washington, have invented certain new and useful Improvements in Chain Saws, of which the following is a specification.

My invention relates to a sawing apparatus in which the toothed members are made in short sections and connected together to form a chain and in the means employed for driving said chain to cause it to cut.

The object of my invention is to produce a chain saw and a means for operating it, thereby providing an apparatus which will constitute a convenient, efficient and reliable means for cutting timber, the same being intended for all uses to which the ordinary crosscut saw is usually put.

Figure 1 is a side view of a few links of my preferred type of construction of the saw.

Fig. 2 is a cross section through a link on the line 2—2 of Fig. 1.

Fig. 3 is a side view of a saw mounted upon a frame of very simple construction.

Fig. 4 shows an edge view of the saw actuating wheel and the mechanism for actuating said parts.

Fig. 5 shows a type of apparatus for making use of my saw to cut through a standing tree or a log.

Fig. 6 is an elevation of the saw actuating apparatus shown in Fig. 5.

In carrying out my invention I form the body of the saw as a number of links which are pivoted together to form an endless chain and to each link attach a tooth section which may be renewed, or replaced by a section having a different form of tooth. Such chain is supported, guided and actuated by special mechanisms which also form part of my invention.

The details of construction of the chain are shown in their preferred form in Figs. 1 and 2. The main link body 1, may be made of three plates secured together in face contact, or from a single piece of metal, as desired or found most suitable.

This part of the link when completed has two pockets 10, one at each end, which receive the ends of the connecting links 12. The link body 1 has a central flange 11 extending the length of the side toward the teeth.

The link body does not have the cutting teeth formed directly thereon, but upon a separate and removable section 2 which has a central slot which snugly receives the flange 11 of the link body. The link body and tooth section are secured by rivets 13, which may be removed when it is desired to apply a new or different tooth section.

The inner corners of the tooth sections are cut away, as at 14, so that the chain may bend enough to pass about the guide and driving pulleys. At one of the outer corners it has a central flange or ear 15 and at the other outer corner a complemental socket for the reception of the ear 15 of the adjacent link, thereby insuring proper alinement between adjacent links. The end edges of the combined or completed link outwardly from the pivot connections abut against each other when the chain is straightened out.

In Figs. 3 and 4 is shown a simple form of mechanism for using such a chain. This employs a frame, represented by a bar 3 in one end of which is journaled an idler wheel 40 and in the other a driving wheel 4. These two wheels are, or may be, alike in construction, having a central core 42 and flanges 41 between which the saw fits snugly.

In the driver 4, the flanges 41 are made of disks which are movable toward and from each other enough to grip the chain strongly between them or to permit it to run freely between them. This may be most simply done by making the disks 41 of thin resilient plates and forcing these together upon the saw when the saw is to be driven.

This gripping action may be conveniently secured by the application of rollers to the outer surfaces of the disks. In Fig. 4 I have shown levers 5 pivoted at 50 and carrying rollers 51. The ends of the levers 5, outwardly of the saw, are connected by a bolt 52 which has a spring 53 between its head and one lever and has a hand adjusting wheel 54 screwing as a nut upon the bolt.

The pressure applied through the disks to the saw may thus be adjusted in amount and applied in a resilient manner so that slippage on the saw will occur if undue resistance be met by the saw. I thus provide a safety feature in the saw operating mechanism. The disks thus constitute a friction clutch for driving the saw. For turning this friction clutch a crank 43 may be applied to the shaft of the disks, or a power drive may be connected thereto in any suitable manner.

In Figs. 5 and 6 I have shown another manner of mounting the saw upon a frame for such use as cutting down trees. The frame 30, instead of being the simple straight frame of Fig. 3, is an arch-like or curved truss which carries several idler wheels 40, and whereby the saw 21 may cut deeply into a large log, the size depending upon size of the frame.

When used in cutting down trees, a pivot frame like that of Fig. 6 may be used. This has a frame 6 provided with a toe 60 adapted to fit a notch cut in the tree, and a lever 7 pivoted thereon and having a like end 70 adapted to fit another notch in the tree, these being tightened by the action of bolt 71 and hand nut 72. The end section of the frame 30 has a bracket arm 31 which is pivoted at 32 on the frame 6, as is also the main frame at 33.

The style of frame in which to mount the saw may be varied to suit the needs of different cases, as may also the manner of applying power to the friction clutch.

What I claim as my invention is:

1. The combination with a chain saw of a driving member having two resilient disks adapted to receive the saw between them, two rollers mounted to engage the outer faces of said disks oppositely to each other, and means for yieldingly pressing said rollers upon the disks.

2. The combination with a chain saw of a driving wheel having disk faces adapted to engage opposite side faces of the saw and relatively movable to grip the saw, a pivoted arm carrying a roller engaging the movable gripping member, and means for applying a yielding pressure to said arm to grip the saw.

3. The combination with a chain saw of a driving wheel having disk faces adapted to engage opposite side faces of the saw and relatively movable to grip the saw, an arm pivoted at each side of said disks to swing toward and from the disks and extending beyond the saw, rollers carried by these arms and engaging the outer faces of the disks, a rod connecting the outer end of these arms, a nut threading upon said rod and a spring interposed between the rod and an arm to take the clamping strain.

Signed at Seattle, Washington, this 21st day of November, 1917.

GEORGE MEYER.